(12) United States Patent  
Nakazono et al.

(10) Patent No.: US 8,274,579 B2  
(45) Date of Patent: Sep. 25, 2012

(54) IMAGE PROCESSING APPARATUS AND IMAGING APPARATUS

(75) Inventors: Keisuke Nakazono, Hino (JP); Akira Ueno, Hachioji (JP); Yoshinobu Tanaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 325 days.

(21) Appl. No.: 12/772,414

(22) Filed: May 3, 2010

(65) Prior Publication Data

US 2010/0321538 A1   Dec. 23, 2010

(30) Foreign Application Priority Data

Jun. 17, 2009  (JP) .................................. 2009-144449

(51) Int. Cl.
*H04N 5/225* (2006.01)
*H04N 5/217* (2011.01)
*G06K 9/40* (2006.01)
(52) U.S. Cl. ...................... 348/222.1; 348/241; 382/275
(58) Field of Classification Search ............... 348/222.1, 348/241; 382/275
See application file for complete search history.

(56) References Cited

U.S. PATENT DOCUMENTS

| 7,747,104 B2 * | 6/2010 | Takata et al. ................... 382/284 |
| 2007/0025636 A1 * | 2/2007 | Furukawa et al. ............. 382/275 |
| 2010/0260428 A1 * | 10/2010 | Ueno et al. ..................... 382/232 |

FOREIGN PATENT DOCUMENTS

| JP | 2002-304624 | 10/2002 |
| JP | 2005-44098 | 2/2005 |

* cited by examiner

*Primary Examiner* — Daniel M Pasiewicz  
(74) *Attorney, Agent, or Firm* — Straub & Pokotylo; John C. Pokotylo

(57) ABSTRACT

An image processing apparatus includes a distortion correction unit, a distortion correction range calculation unit, a control unit, a storage control unit, and a margin storage memory. The distortion correction unit performs a distortion correction processing on image data stored in a frame memory. The distortion correction range calculation unit calculates distortion correction ranges. The control unit determines an input image range from present distortion correction range and next distortion correction range. The storage control unit calculates a range for a part of the image data corresponding to the input image range from the present distortion correction range and the next distortion correction range. The margin storage memory stores the image data of the range calculated by the storage control unit. The image data input to the distortion correction unit includes both the image data from the frame memory and the image data from the margin storage memory.

12 Claims, 6 Drawing Sheets

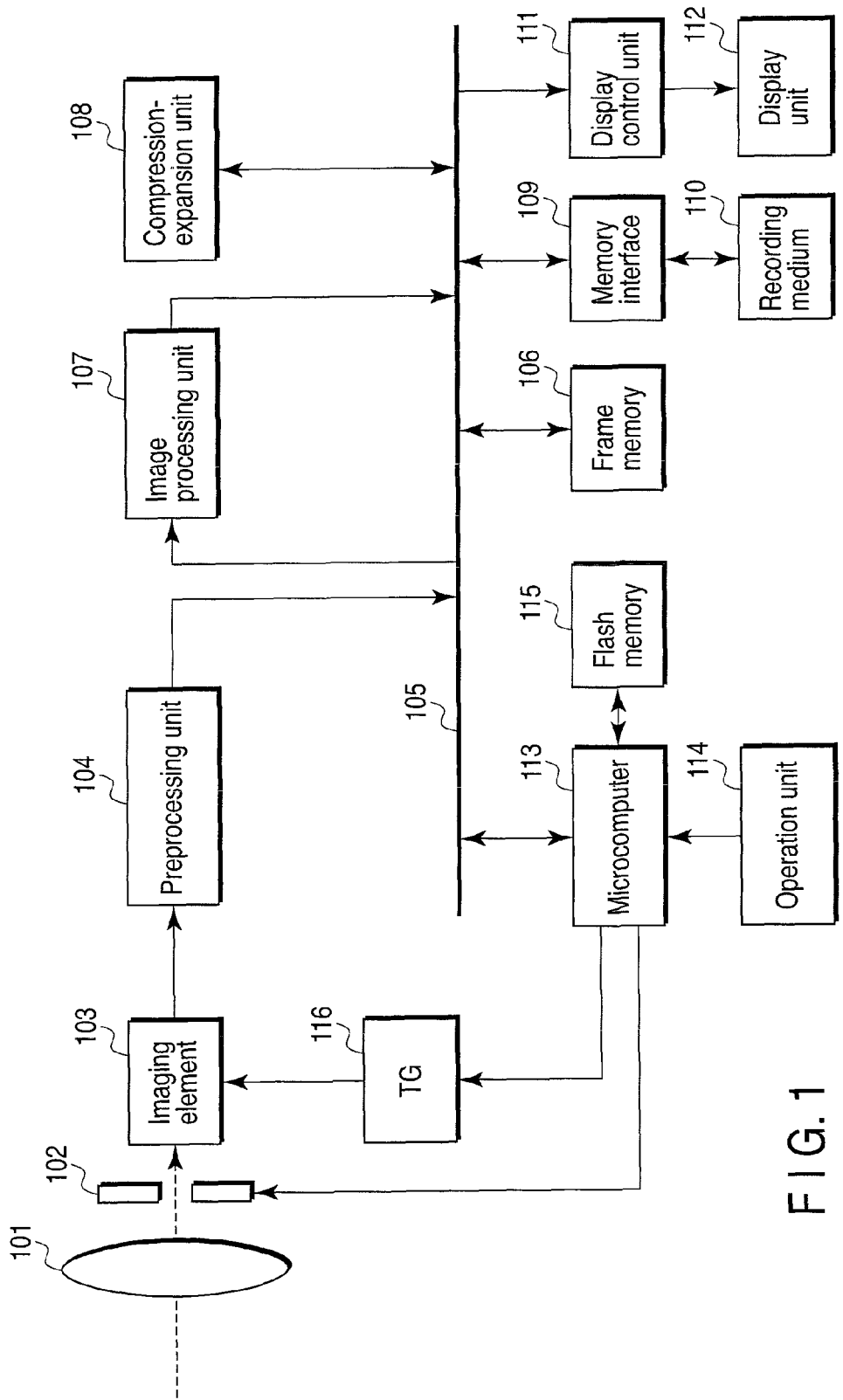
F I G. 1

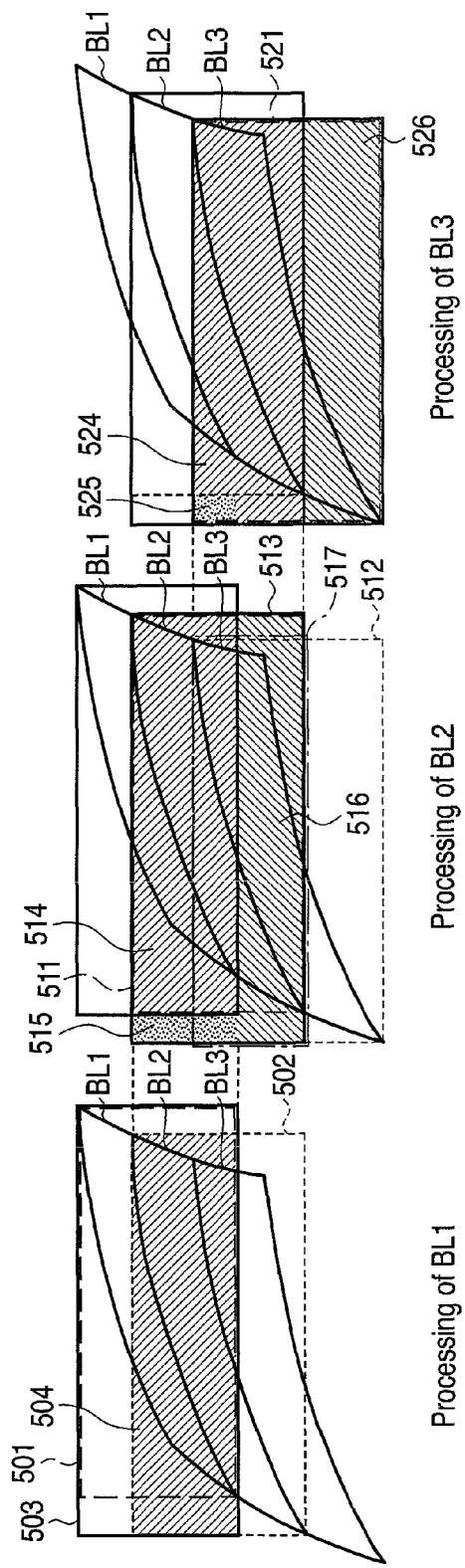
F I G. 6

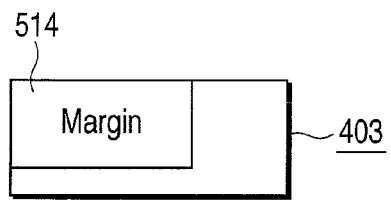
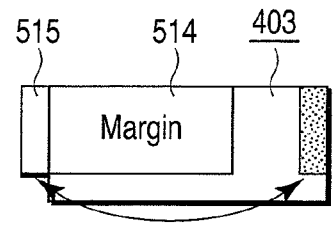

FIG. 7A  FIG. 7B

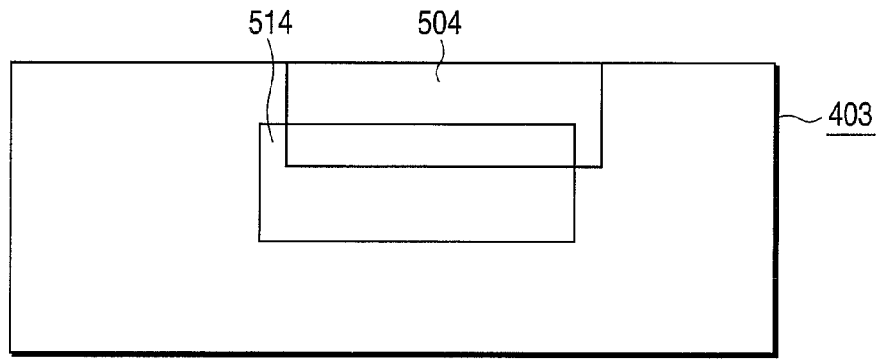

FIG. 8

Image data not subjected to distortion correction
(in units of block lines)

| Block line segment 1-1 | Block line segment 1-2 |
| Block line segment 2-1 | Block line segment 2-2 |
| Block line segment 3-1 | Block line segment 3-2 |
| Block line segment 4-1 | Block line segment 4-2 |
| Block line segment 5-1 | Block line segment 5-2 |
| Block line segment 6-1 | Block line segment 6-2 |
| Block line segment 7-1 | Block line segment 7-2 |
| Block line segment 8-1 | Block line segment 8-2 |
| Block line segment 9-1 | Block line segment 9-2 |
| Block line segment 10-1 | Block line segment 10-2 |

FIG. 9

IMAGE PROCESSING APPARATUS AND IMAGING APPARATUS

CROSS-REFERENCE TO RELATED APPLICATIONS

This application is based upon and claims the benefit of priority from prior Japanese Patent Application No. 2009-144449, filed Jun. 17, 2009, the entire contents of which are incorporated herein by reference.

BACKGROUND OF THE INVENTION

1. Field of the Invention

The present invention relates to an image processing apparatus configured to perform a distortion correction processing, and an imaging apparatus having such an image processing apparatus.

2. Description of the Related Art

Any imaging apparatus, such as a digital camera, uses a lens to focus light from an object and thereby form an image on an imaging element. Since the lens produces aberration, the image formed on the imaging element is inevitably distorted and so is not a true representation of the object. In recent years, more and more imaging apparatuses have been developed, which have a distortion correction function. The distortion correction function is a means for correcting distorted images by processing digital image data. Further, various proposals have been made in connection with the distortion correction processing.

For example, Jpn. Pat. Appln. KOKAI Publication No. 2005-44098 discloses a distortion correction processing in which single-frame image data stored in a frame memory is divided into a plurality of blocks (i.e., block lines). In the invention of Jpn. Pat. Appln. KOKAI Publication No. 2005-44098, such an input range of image data as will provide, by correcting the image distortion, image data of block line corresponding to a desired rectangular area is determined prior to the distortion correction processing. After determining the input range of image data, the image distortion is corrected, block line by block line. Thus, the distortion correction processing can be accomplished by using the minimum amount of image data required.

In order to simplify the processing performed in the distortion correction circuit, the input range of image data to input to the distortion correction circuit should be a rectangular area including parts that should be subjected to distortion correction. If image data of the block line corresponding to the rectangular area is input, the lower end of the block line being processed will overlap the upper end of the block line to be processed next. If the overlapping end parts of two adjacent block lines are both processed, the efficiency of processing image data will inevitably decrease.

Jpn. Pat. Appln. KOKAI Publication No. 2002-304624 proposes a technique of avoiding such double processing of image data in the spatial filter processing. In the invention of Jpn. Pat. Appln. KOKAI Publication No. 2002-304624, that part of the intermediate data being processed in a filter processing means, which should also be used in processing the next image segment, is stored in a frame memory (image memory).

BRIEF SUMMARY OF THE INVENTION

According to a first aspect of the invention, there is provided an image processing apparatus comprising: a distortion correction unit configured to perform a distortion correction processing on image data generated and stored in a frame memory; a distortion correction range calculation unit configured to calculate distortion correction ranges of respective block lines of the image data, each range being a rectangular area that the distortion correction unit uses to perform the distortion correction processing on one block line; a control unit configured to determine an input image range for the image data that is input as present block line to the distortion correction unit, from present distortion correction range and next distortion correction range, the present distortion correction range having been calculated, by the distortion correction range calculation unit, for the present block line being processed at present in the distortion correction unit, and the next distortion correction range having been calculated, by the distortion correction range calculation unit, for at least one block line following the present block line; a storage control unit configured to calculate a range for a part of the image data corresponding to the input image range, from the present distortion correction range and the next distortion correction range, the part of the image data being necessary also for the next block line to be processed in the distortion correction unit; and a margin storage memory configured to store, as margin data, the image data of the range calculated by the storage control unit, wherein the image data input to the distortion correction unit and corresponding to the input image range includes both the image data read from the frame memory and the margin data read from the margin storage memory.

According to a second aspect of the invention, there is provided an imaging apparatus comprising: a lens configured to focus an optical image of an object; an imaging unit configured to convert the optical image focused by the lens, to image data; a frame memory configured to store the image data generated in the imaging unit; a distortion correction unit configured to perform a distortion correction processing on image data stored in a frame memory; a distortion correction range calculation unit configured to calculate distortion correction ranges of respective block lines of the image data, from distortion data about the lens, each range being a rectangular area that the distortion correction unit uses to perform the distortion correction processing on one block line; a control unit configured to determine an input image range for the image data that is input as present block line to the distortion correction unit, from present distortion correction range and next distortion correction range, the present distortion correction range having been calculated, by the distortion correction range calculation unit, for the present block line being processed at present in the distortion correction unit, and the next distortion correction range having been calculated, by the distortion correction range calculation unit, for at least one block line following the present block line; a storage control unit configured to calculate a range for a part of the image data corresponding to the input image range, from the present distortion correction range and the next distortion correction range, the part of the image data being necessary also for the next block line to be processed in the distortion correction unit; and a margin storage memory configured to store, as margin data, the image data of the range calculated by the storage control unit, wherein the image data input to the distortion correction unit and corresponding to the input image range includes both the image data read from the frame memory and the margin data read from the margin storage memory.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

FIG. 1 is a diagram showing an exemplary configuration of an imaging apparatus having an image processing apparatus according to an embodiment of the invention;

FIG. 6 is a diagram illustrating a specific example of the distortion correction processing performed in the embodiment;

FIGS. 7A and 7B are diagrams explaining a method of reading dummy data;

FIG. 8 is a diagram explaining a method of writing margin image data; and

FIG. 9 is a diagram showing block lines obtained by dividing image data in the column direction.

DETAILED DESCRIPTION OF THE INVENTION

Figure 2:
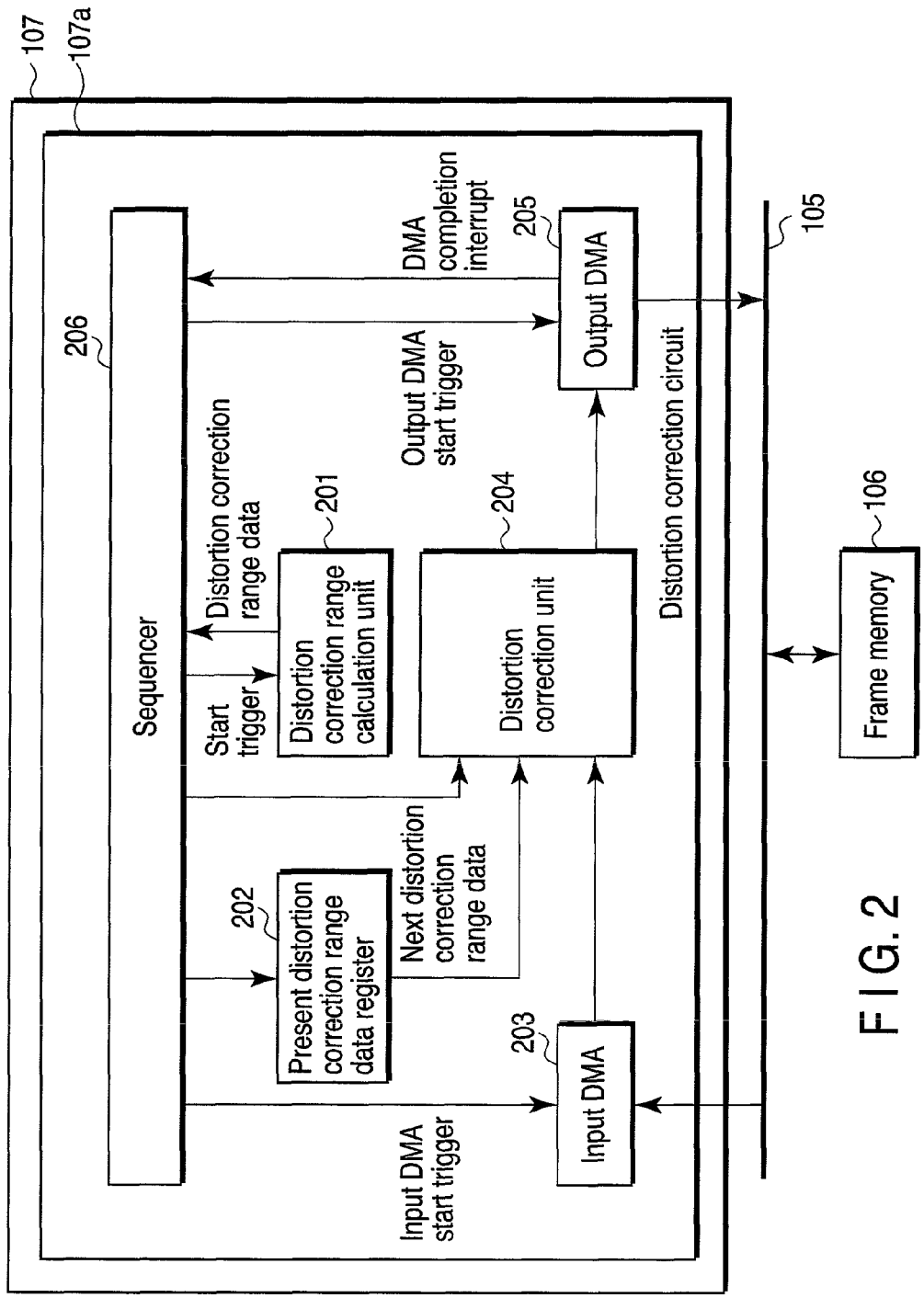
FIG. 2 is a diagram showing an exemplary configuration of a distortion correction circuit incorporated in the embodiment of the invention.

An embodiment of the invention will be described with reference to the accompanying drawings.

FIG. 1 is a diagram showing an exemplary configuration of an imaging apparatus having an image processing apparatus according to an embodiment of the invention. As shown in FIG. 1, the imaging apparatus has a lens 101, a shutter diaphragm 102, an imaging element 103, a preprocessing unit 104, a bus 105, a frame memory 106, an image processing unit 107, a compression-expansion unit 108, a memory interface 109, a recording medium 110, a display control unit 111, a display unit 112, a microcomputer 113, an operation unit 114, a flash memory 115, and a timing generator (TG) 116.

The lens 101 focuses light from an object on the imaging element 103. The shutter diaphragm 102 is located near the lens 101. The shutter diaphragm 102 is a device that works as both a shutter and a diaphragm under the control of the microcomputer 113, and adjusts the amount of light incident from the lens 101 on the imaging element 103 (i.e., the amount of light to which the imaging element 103 is exposed). Needless to say, the shutter diaphragm 102 may be replaced by a separate shutter and diaphragm.

The imaging element 103 has a light receiving surface on which photoelectric transducer elements, such as photodiodes, are arranged in a two-dimensional pattern. To the light receiving surface, color filters are affixed, defining a Bayer arrangement. So configured, the imaging element 103 converts the light focused on the light receiving surface to an electrical signal (image signal). The imaging element 103 outputs this image signal to the preprocessing unit 104. The preprocessing unit 104 performs various analog processes, such as correlated double sampling (CDS) and automatic gain control (AGC), on the image signal output from the imaging element 103. Further, the preprocessing unit 104 converts the image signal, i.e., the signal subjected to analog processing, to a digital signal (hereinafter called "image data"). The image data is transferred to the frame memory 106 over the bus 105.

The bus 105 is a transfer path for transferring the various data items generated in the imaging apparatus to the components provided in the imaging apparatus. The bus 105 is connected to the preprocessing unit 104, frame memory 106, image processing unit 107, compression-expansion unit 108, memory interface 109, display control unit 111 and microcomputer 113.

The frame memory 106 temporarily stores the image data acquired in the preprocessing unit 104 and the image data processed in the image processing unit 107 and compression-expansion unit 108.

In this embodiment, the image processing unit 107 performs various processes on the image data stored in the frame memory 106. The image processing unit 107 has at least a distortion correction circuit that corrects the image distortion resulting from the aberration produced by the lens 101 and reflected in the image data. In addition, the image processing unit 107 has various image processing circuits, such as a luminance-color difference (YC) processing circuit, a white balance correction circuit and a noise reduction circuit. The YC processing circuit is a circuit that converts image data produced by the Bayer arrangement to YC data. The white balance correction circuit is a circuit that corrects the color balance of the image data. The noise reduction circuit is a circuit that reduces the noise contained in the image data. These image processing circuits are independently connected to, for example, the bus 105. Alternatively, the image processing circuits may be connected in series by a small-capacity buffer memory.

To record image data, the compression-expansion unit 108 first reads the image data processed in the image processing unit 107 from the frame memory 106 over the bus 105, and then compresses the image data by using, for example, the JPEG system. Conversely, to reproduce image data, the compression-expansion unit 108 first reads the compressed image data recorded in the recording medium 110 from the frame memory 106 over the bus 105, and then expands the image data thus read.

The memory interface 109 controls the writing and reading of data to and from the recording medium 110. The recording medium 110 is, for example, a memory card that can be removably inserted in the imaging apparatus. The recording medium 110 can store such as the image data compressed in the compression-expansion unit 108.

The display control unit 111 reads image data from the frame memory 106 and converts it to an image signal. The display control unit 111 outputs the image signal to the display unit 112, which displays images. The display unit 112 is, for example, a TFT liquid crystal display, and displays the image represented by the image signal output from the display control unit 111.

The microcomputer 113 controls all operation sequences performed in the main unit of the imaging apparatus. The microcomputer 113 is connected to the operation unit 114 and flash memory 115.

The operation unit 114 has various manually operable members, which the user may operate to make the imaging apparatus of FIG. 1 work. When any one of the operable members is operated, the microcomputer 113 performs the operation sequence associated with the operable members operated. The flash memory 115 stores various parameters that the imaging apparatus needs. The flash memory 115 also stores the various programs the microprocessor 113 may execute. In accordance with the programs stored in the flash memory 115, the microprocessor 113 reads the parameters for any operation sequence from the flash memory and performs each process.

The TG 116 generates a sync signal that controls the operation timing of the imaging element 103, in accordance with a control signal supplied from the microcomputer 113.

The distortion correction processing performed in the image processing unit 107 will be explained. FIG. 2 shows the configuration of the distortion correction circuit 107a that is incorporated in the image processing unit 107.

As shown in FIG. 2, the distortion correction circuit 107a has a distortion correction range calculation unit 201, a present distortion correction range data register 202, an input direct memory access (DMA) unit 203, a distortion correction unit 204, an output direct memory access (DMA) unit 205, and a sequencer 206.

Figures 3A, 3B:
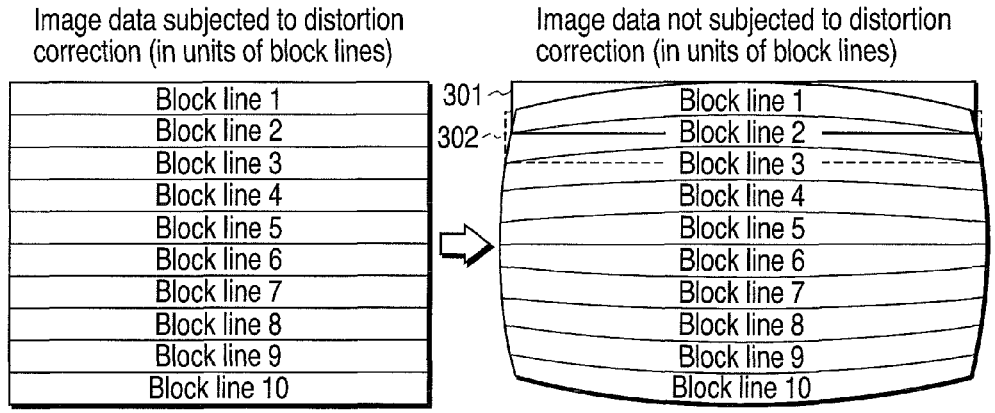
FIGS. 3A and 3B are diagrams illustrating the relationship between the distortion of each block line and the distortion correction range.

The distortion correction range calculation unit 201 receives a start trigger from the sequencer 206, calculates a distortion correction range in units of block lines, and outputs the data representing the range to the sequencer 206. The distortion correction range is coordinate data that is necessary for the processing of correcting image distortion in units of block lines. The degree of distortion of the image represented by the image data acquired by the imaging element 103 from the distortion data about the lens 101 can be predicted. Assume that the image subjected to the distortion correction is composed of rectangular blocks (i.e., block lines) each having the same number of pixels arranged in the column direction as shown in FIG. 3A. Then, the distortion correction processing must be performed on the image data corresponding to block line 1 that is distorted as shown in FIG. 3B in order to obtain, for example, such a result as illustrated in FIG. 3A. In practice, rectangular block 301, including the image data representing distorted block line 1, should better be subjected to the distortion correction processing, thereby to simplify the processing performed in the distortion correction unit 204. Similarly, rectangular block 302 shown in FIG. 3B should better be subjected to the distortion correction processing, in order to obtain such a result for block line 2 as illustrated in FIG. 3A. The distortion correction range calculation unit 201 calculates a distortion correction range for the rectangular block that is necessary for the distortion correction processing. Since the position of the image subjected to the distortion correction processing has a specific relationship to that of the image not subjected yet to the processing, the distortion correction range calculation unit 201 predicts the image subjected to the processing, from the distortion data about the lens 101 and some other data. From the image predicted, the distortion correction range calculation unit 201 generates the coordinate data about the rectangular block including the distorted block line. The coordinate data will be used as distortion correction range data.

As can be seen from FIG. 3B, rectangular block 301 and rectangular block 302 partly overlap. In this case, the image processing efficiency will decrease if the image data representing the overlapping parts of blocks 301 and 302 are read from the frame memory 106 and processed in both the distortion correction processing performed on block line 1 and the distortion correction processing performed on block line 2. In this embodiment, in order not to read the overlapping parts of rectangular blocks, those parts of any block line and the next block line, which are both processed while the first-mentioned block line is being processed, is stored as margin image data in the margin storage memory (described later in detail) provided in the distortion correction unit 204. To process the next block line, only the image data representing the part not overlapping the preceding block line is read from the frame memory 106, and the image data representing the remaining part is read from the margin storage memory. This minimizes the amount in which the image data is unnecessarily read from the frame memory 106.

Moreover, in the embodiment, the input range of image data to input from the frame memory 106 to the distortion correction circuit (later described in detail) incorporated in the distortion correction unit 204 and the input range of image data to input from the margin storage memory are obtained from present distortion correction range data and next distortion correction range data. The present distortion correction range data is associated with the block line the distortion correction unit 204 is now processing. The next distortion correction range data is associated with the block line the distortion correction unit 204 will process next. Thus, even if the margin image data changes in position because of the degree of distortion in the image data, the margin image data about a rectangular area can be correctly stored in the margin storage memory.

The present distortion correction range data register 202 holds the present distortion correction range data calculated in the distortion correction range calculation unit 201.

On receiving an input DMA start trigger from the sequencer 206, the input DMA unit 203 performs DMA transfer to read the image data from the frame memory 106, so that the image data may be processed to correct the distortion in units of block lines.

Figure 4:
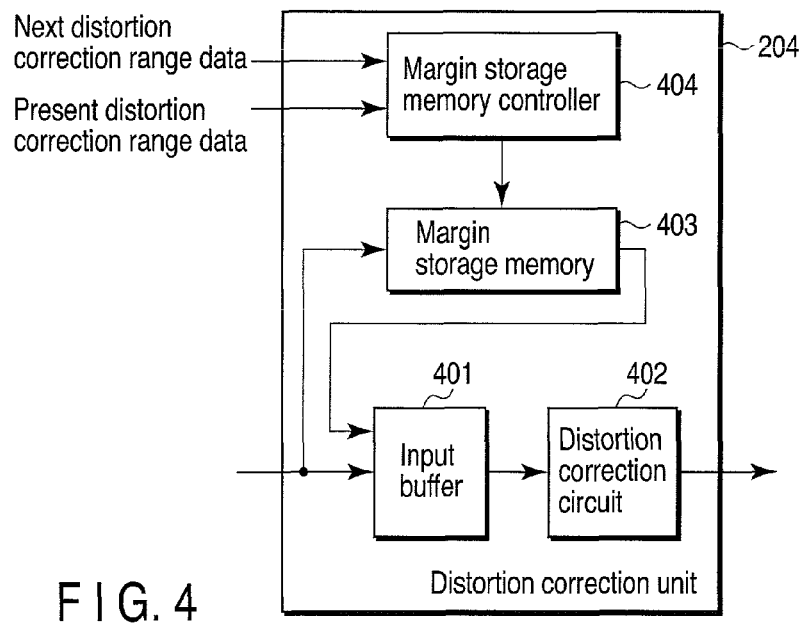
FIG. 4 is a diagram showing a configuration of a distortion correction unit incorporated in the distortion correction circuit.

As shown in FIG. 4, the distortion correction unit 204 has an input buffer 401, a distortion correction circuit 402, a margin storage memory 403, and a margin storage memory controller 404.

The input buffer 401 is a buffer memory that temporarily holds the image data read from the frame memory 106 or the image data read from the margin storage memory 403. The distortion correction circuit 402, which works as distortion correction unit, performs distortion correction processing on the image data input from the input buffer 401. The distortion correction processing is accomplished by coordinate transformation that replaces the points of image data for such a distorted block line as shown in FIG. 3B, with the points of image data for such a distortion free block line as shown in FIG. 3A.

The margin storage memory 403 stores, as margin image data, that part of the image data input to the distortion correction unit 204 for the block line being subjected to the distortion correction processing, which will be used also in the distortion correction processing to be performed on the next block line. The margin storage memory controller 404, which functions as a memory controller, determines the range of the margin image data to be stored in the margin storage memory 403, from the present distortion correction range data and the next distortion correction range data. The margin storage memory controller 404 controls the writing of the margin image data input from the distortion correction unit 204 to the margin storage memory 403, in accordance with the range of the margin data calculated. Further, the margin storage memory controller 404 controls the reading of the margin image data from the margin storage memory 403, thereby enabling the distortion correction circuit 402 to perform the distortion correction processing.

On receiving an output DMA start trigger from the sequencer 206, the output DMA unit 205 performs DMA transfer to write, to the frame memory 106, the image data subjected to the distortion correction processing in the distortion correction unit 204.

The sequencer 206 controls the other components of the distortion correction circuit 107a shown in FIG. 2. In the embodiment, the sequencer 206 functions as a control unit, too. That is, the sequencer 206 determines the range of image data to be read from the frame memory 106 (i.e., input range) in order to perform the distortion correction processing, from the present distortion correction range data and the next distortion correction range data.

Figure 5:
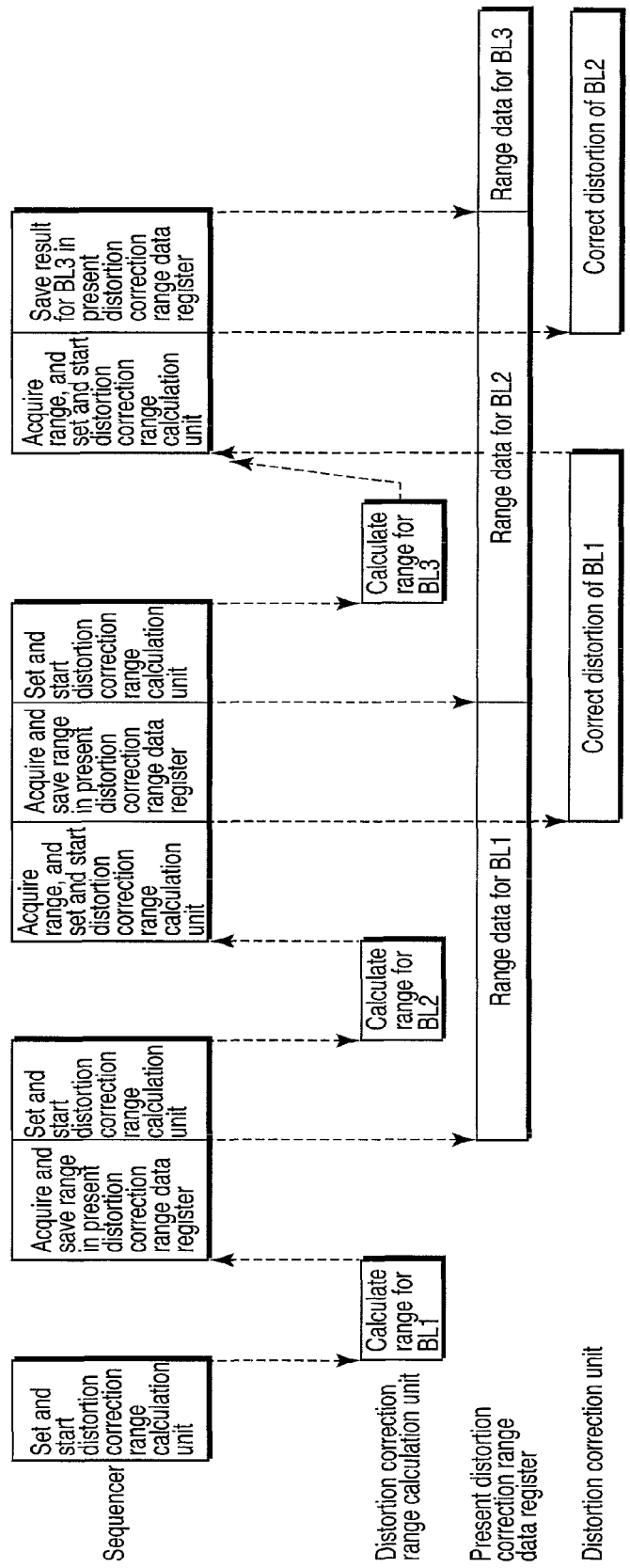
FIG. 5 is a timing chart explaining how the distortion correction circuit operates in the embodiment of the invention.

The operation of the distortion correction circuit 107a described with reference to FIGS. 2, 3A, 3B and 4 will be explained with reference to FIG. 5. FIG. 5 is a timing chart explaining how the distortion correction circuit 107a operates. More precisely, FIG. 5 explains how the circuit 107a processes three block lines BL1 to BL3 shown in FIG. 6.

First, the distortion correction circuit 107a corrects the distortion of block line 1 that is the upper end of the image data input to the frame memory 106. In the distortion correction circuit 107a, the sequencer 206 sets the distortion correction range calculation unit 201, enabling the same to calculate a distortion correction range for block line 1. Then, the sequencer 206 inputs a start trigger to the distortion correction range calculation unit 201. On receiving the start trigger, the distortion correction range calculation unit 201 calculates the distortion correction range for block line 1. As described above, the distortion correction range is a range corresponding to the rectangular block surrounding block line 1 that is distorted. Hence, the distortion correction range corresponding to block line 1 shown in FIG. 6 is range 501. The coordinate data (distortion correction range data) calculated in the distortion correction range calculation unit 201 and corresponding to block line 1 is output to the sequencer 206, as the present distortion correction range data for block line 1.

As described above, the sequencer 206 needs two distortion correction range data items, i.e., the present distortion correction range data and the next distortion correction range data, in order to determine the range of image data that should be input. Therefore, the sequencer 206 sets the distortion correction range calculation unit 201, enabling the unit 201 to calculate a distortion correction range for block line 2. After setting the unit 201 so, the sequencer 206 inputs a start trigger to the distortion correction range calculation unit 201. On receiving the start trigger, the distortion correction range calculation unit 201 calculates the distortion correction range for block line 2. For block line 2 shown in FIG. 6, for example, the distortion correction range is range 502. The distortion correction range corresponding to block line 2, thus calculated in the distortion correction range calculation unit 201, is output to the sequencer 206, as the next distortion correction range data for block line 1.

After the distortion correction range for block line 1 and the distortion correction range for block line 2 have been calculated, the sequencer 206 determines the input range of the image data to be input to the distortion correction circuit 402, so that block line 1 may be processed. The input range of the image data for block line BLn now undergoing the distortion correction processing is calculated as follows, from the distortion correction range (i.e., present distortion correction range data) for block line BLn and the distortion correction range (i.e., next distortion correction range data) for block line BLn+1.

Input range width in the vertical direction: width of the distortion correction range for block line BLn, measured in the vertical direction Input range width in the horizontal direction: width including both the width of the distortion correction range for block line BLn, measured in the horizontal direction, and the width of the distortion correction range for block line BLn+1, measured in the horizontal direction In the case of FIG. 6, the width of the input range for block line 1, measured in the vertical direction, is the width of distortion correction range 501 for block line 1, measured in the vertical direction. The width of the input range, measured in the horizontal direction, is the width including both the width of distortion correction range 501 for block line 1, measured in the horizontal direction, and the width of distortion correction range 502 for block line 2, measured in the horizontal direction. Hence, the input range required for processing block line 1 is input range 503 shown in FIG. 6. After determining the input range, the sequencer 206 stores the distortion correction range data for block line 2 in the present distortion correction range data register 202. The distortion correction range data can therefore be used to process the next block line 2.

Further, the sequencer 206 inputs the distortion correction range data for block line 1 and the distortion correction range data for block line 2 to the margin storage memory controller 404. The margin storage memory controller 404 calculates the range of margin image data, i.e., the part of the image data corresponding to input range 503 and required for correcting the distortion of block line 2, from the distortion correction range data for block line 1 and the distortion correction range data for block line 2. This range is the range in which the distortion correction range data for the present block line and the distortion correction range data for the next block line overlap. In the case of FIG. 6, for example, input range 504 in which input range 503 and distortion correction range 502 overlap is the range of margin image data necessary for the distortion correction processing performed on block line 2. The image data over this range is stored, as margin image data, in the margin storage memory 403. Thus, the image data representing that part of block line 2 which overlaps the image data representing block line 1 need not be read from the frame memory 106 while the distortion correction processing is being performed on block line 2.

After determining both input range 503 and input range 504, the sequencer 206 inputs an input DMA start trigger to the input DMA unit 203. The image data corresponding to input range 503 is thereby read from the frame memory 106. The image data read though the input DMA unit 203 is sequentially input to the input buffer 401 of the distortion correction unit 204. At this point, the margin storage memory controller 404 controls the writing of the margin storage memory 403 so that the image data over input range 504, which is a part of the image data read via the input DMA unit 203 and which corresponds to the margin image data, may be written.

The image data input to the input buffer 401 is sequentially input to the distortion correction circuit 402. The distortion correction circuit 402 performs the distortion correction processing on the image data input. After the distortion correction processing has been performed in the distortion correction circuit 402, the sequencer 206 inputs an output DMA start trigger to the output DMA unit 205. As a result, the image data is written to the frame memory 106 from the distortion correction circuit 402 of the distortion correction unit 204. After the image data has been thus written, an interrupt signal representing the transfer completion is input to the sequencer 206. The distortion correction processing thus terminates with respect to block line 1.

While the distortion correction processing is being performed on the image data about block line 1, the sequencer 206 sets the distortion correction range calculation unit 201, enabling the unit 201 to calculate the distortion correction range for the next block line, i.e., block line 3. After setting the unit 201, the sequencer 206 inputs a start trigger to the distortion correction range calculation unit 201, to activate the unit 201. On receiving the start trigger, the distortion correction range calculation unit 201 calculates the distortion correction range for block line 3. Range 512 is the distortion correction range calculated for block line 3 shown in FIG. 6. The distortion correction range data representing the distortion correction range calculated for block line 3 in the distortion correction range calculation unit 201 is input to the sequencer 206, as the next distortion correction range data for block line 2.

After the distortion correction range data for block line 3 has been input, the sequencer 206 determines the input range for the image data that should be input to the distortion correction circuit 402 in order to process block line 2, from the distortion correction range data for block line 3, calculated in the distortion correction range calculation unit 201, and the distortion correction range data for block line 2, held in the present distortion correction range data register 202. In the case of FIG. 6, for example, the width of the input range for block line 2, measured in the vertical direction, is the width of distortion correction range 511 for block line 2, measured in the vertical direction. The width of the input range, measured in the horizontal direction, is the sum of the width of distortion correction range 511 for block line 2 and the width of distortion correction range 512 for block line 3, both measured in the horizontal direction. Hence, the input range required for processing block line 2 is input range 513 shown in FIG. 6. After determining the input range, the sequencer 206 stores the distortion correction range data for block line 3 in the present distortion correction range data register 202. The distortion correction range data can therefore be used to process the next block line 3.

Further, the sequencer 206 inputs the distortion correction range data for block line 2 and the distortion correction range data for block line 3 to the margin storage memory controller 404. The margin storage memory controller 404 calculates the range of margin image data, i.e., the part of the image data corresponding to input range 513 and required for correcting the distortion of block line 3, from the distortion correction range data for block line 2 and the distortion correction range data for block line 3. In the case of FIG. 6, for example, input range 517 in which input range 513 and distortion correction range 512 overlap is the range of margin image data necessary for the distortion correction processing performed on block line 2.

That part of the image data for input range 513 necessary for the processing of block line 2, which corresponds to range 514, is stored in the margin storage memory 403. Therefore, the image data corresponding to range 514 is read from the margin storage memory 403. Input range 513 deviates to the left with respect to input range 503, nevertheless. Therefore, the margin storage memory 403 does not store the image data corresponding to range 515 to the left of range 514. Assume that image data corresponding to any range not stored in the margin storage memory 403 must be read from the frame memory 106. Then, this image data should be read in the form of a letter L from the frame memory 106. To read the image data in this manner, the circuit configuration must be complex.

The image data corresponding to range 515 secures the range required for inputting the image data necessary for the distortion correction processing performed on block line 2. This image data does not directly contribute to the distortion correction processing. Therefore, dummy data corresponding to range 515 is read from the margin storage memory 403, thereby performing dummy reading of the margin image data about a rectangular area. Assume that an address of the range including both range 514 and range 515 is designated, reading margin image data, while the margin image data remains stored at the designated address in the margin storage memory 403 as shown in FIG. 7A. Then, as shown in FIG. 7B, the dummy data corresponding to range 515 is read from the position where the address is turned over. The dummy data is not limited to a particular one. Rather, it may be, for example, any margin image data used in the past.

With this configuration it suffices to read only the image data image data about a rectangular area, which is defined by a range 516, from the frame memory 106.

To read image data in this way, the sequencer 206 inputs an input DMA start trigger to the input DMA unit 203. As a result, the image data corresponding to range 516 is read from the frame memory 106. Moreover, the sequencer 206 controls the margin storage memory controller 404, causing the controller 404 to read the margin image data. The image data and the margin image data, both read via the input DMA unit 203, are input to the input buffer 401 of the distortion correction unit 204. The margin storage memory controller 404 controls the margin storage memory 403, thereby writing, to the memory 403, that part of the image data read via the input DMA unit 203, which corresponds to range 517 for the margin image data. Thus, the margin image data for processing the present block line n is read at the same time the margin image data for processing the next line n+1 is written, in the embodiment. Therefore, the margin image data for processing the present block line n should not be overwritten until it is completely read. The margin image data for processing the present block line n and the margin image data for processing the next line n+1 may overlap in part. In this case, they may be written in the overlapping state, as is illustrated in FIG. 8.

The image data input to the input buffer 401 is sequentially input to the distortion correction circuit 402. The distortion correction circuit 402 performs the distortion correction processing on the image data input to it. After the distortion correction circuit 402 has performed the distortion correction processing, the sequencer 206 inputs an output DMA start trigger to the output DMA unit 205. The image data is thereby written to the frame memory 106 from the distortion correction circuit 402 of the distortion correction unit 204. After the image data has been so written, an interrupt signal representing the transfer completion is input to the sequencer 206.

Block line 3 is processed in the same way as block line 2. However, margin image data need not be stored for any other line, because block line 3 is the last block line. The input range for the image data is therefore distortion correction range 521 for block line 3. Of range 521, a part 524 is held in the margin storage memory 403. For a part 525 of range 521, it suffices to read the dummy data from the margin storage memory 403. Hence, only the image data corresponding to range 526 needs to be read from the frame memory 106.

In this embodiment described above, the range for inputting the image data to the distortion correction circuit, which range corresponds to the block line being processed at present, is determined from the distortion correction range for the block line being processed at present and the distortion correction range for the next block line. The margin image data about a rectangular area can therefore be correctly stored in the margin storage memory even if the margin image data is dislocated because of the distortion of the image data.

The present distortion correction range data is sequentially stored in the present distortion correction range data register 202. Therefore, the distortion correction range need not be calculated for any further distortion correction processing. The distortion correction range may be calculated twice before each block line is subjected to the distortion correction processing. If this is the case, the present distortion correction range data register 202 need not be used at all.

Furthermore, any data not stored as margin image data may be read, as dummy data, from the margin storage memory 403. In this case, the image data representing a rectangular image can be read from the frame memory 106 at all times. This helps to simply the circuit configuration.

In the embodiment described above, the range for inputting image data is determined from two data items, i.e., the present distortion correction range and the next distortion correction range. Instead, the next distortion correction range may be determined from the distortion correction range data for several block lines following the block line now undergoing the distortion correction processing. To determine the input range from the distortion correction range data for, for example, block lines BLn, BLn+1 and BLn+2, it suffices to set the width of input range, measured in the vertical direction, to the width of the distortion correction range for block line BLn, measured in the vertical direction, and to set the width of input range, measured in the horizontal direction, to a width including both the width of distortion correction range for block line BLn+1, measured in the horizontal direction, and the width of distortion correction range for block line BLn+2, measured in the horizontal direction.

In the embodiment described above, the image data is divided in the row direction, providing block lines. In contrast, the image data may be further divided in the column direction, providing more block lines as shown in FIG. 9. In the case of FIG. 9, block lines 1-1, 2-1, 3-1, . . . , 10-1, 1-2, 2-2, . . . , and 10-2 may be subjected to the distortion correction processing in the order they are mentioned. In this case, the distortion correction range calculation unit 201 must be operated twice to process block lines corresponding to the uppermost part of the image data, i.e. block lines 1-1, block line 2-1, 3-1, . . . , 10-1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
    a distortion correction unit configured to perform a distortion correction processing on image data generated and stored in a frame memory;
    a distortion correction range calculation unit configured to calculate distortion correction ranges of respective block lines of the image data, each range being a rectangular area that the distortion correction unit uses to perform the distortion correction processing on one block line;
    a control unit configured to determine an input image range for the image data that is input as present block line to the distortion correction unit, from present distortion correction range and next distortion correction range, the present distortion correction range having been calculated, by the distortion correction range calculation unit, for the present block line being processed at present in the distortion correction unit, and the next distortion correction range having been calculated, by the distortion correction range calculation unit, for at least one block line following the present block line;
    a storage control unit configured to calculate a range for a part of the image data corresponding to the input image range, from the present distortion correction range and the next distortion correction range, the part of the image data being necessary also for the next block line to be processed in the distortion correction unit; and
    a margin storage memory configured to store, as margin data, the image data of the range calculated by the storage control unit,
    wherein the image data input to the distortion correction unit and corresponding to the input image range includes both the image data read from the frame memory and the margin data read from the margin storage memory.

2. The image processing apparatus according to claim 1, wherein the control unit uses, as the horizontal width of the input image range, a width including both the width of the present distortion correction range, as measured in the horizontal direction, and the width of the next distortion correction range, as measured in the horizontal direction, and uses, as the vertical width of the input image range, the width of the present distortion correction range, as measured in the vertical direction.

3. The image processing apparatus according to claim 1, further comprising a register configured to sequentially hold the distortion correction range calculated in the distortion correction range calculation unit,
    wherein the control unit uses, as the present distortion correction range, the distortion correction range held in the register.

4. The image processing apparatus according to claim 2, further comprising a register configured to sequentially hold the distortion correction range calculated in the distortion correction range calculation unit,
    wherein the control unit uses, as the present distortion correction range, the distortion correction range held in the register.

5. The image processing apparatus according to claim 3, wherein the distortion correction range calculation unit calculates the present distortion correction range and the next distortion correction range only if the present block line is the uppermost part of the image data, and calculates only the next distortion correction range if the present block line is other than the uppermost part of the image data.

6. The image processing apparatus according to claim 4, wherein the distortion correction range calculation unit calculates the present distortion correction range and the next distortion correction range only if the present block line is the uppermost part of the image data, and calculates only the next distortion correction range if the present block line is other than the uppermost part of the image data.

7. An imaging apparatus comprising:
    a lens configured to focus an optical image of an object;
    an imaging unit configured to convert the optical image focused by the lens, to image data;
    a frame memory configured to store the image data generated in the imaging unit;
    a distortion correction unit configured to perform a distortion correction processing on image data stored in a frame memory;
    a distortion correction range calculation unit configured to calculate distortion correction ranges of respective block lines of the image data, from distortion data about the lens, each range being a rectangular area that the distortion correction unit uses to perform the distortion correction processing on one block line;

a control unit configured to determine an input image range for the image data that is input as present block line to the distortion correction unit, from present distortion correction range and next distortion correction range, the present distortion correction range having been calculated, by the distortion correction range calculation unit, for the present block line being processed at present in the distortion correction unit, and the next distortion correction range having been calculated, by the distortion correction range calculation unit, for at least one block line following the present block line;

a storage control unit configured to calculate a range for a part of the image data corresponding to the input image range, from the present distortion correction range and the next distortion correction range, the part of the image data being necessary also for the next block line to be processed in the distortion correction unit; and a margin storage memory configured to store, as margin data, the image data of the range calculated by the storage control unit, wherein the image data input to the distortion correction unit and corresponding to the input image range includes both the image data read from the frame memory and the margin data read from the margin storage memory.

8. The imaging apparatus according to claim 7, wherein the control unit uses, as the horizontal width of the input image range, a width including both the width of the present distortion correction range, as measured in the horizontal direction, and the width of the next distortion correction range, as measured in the horizontal direction, and uses, as the vertical width of the input image range, the width of the present distortion correction range, as measured in the vertical direction.

9. The imaging apparatus according to claim 7, further comprising a register configured to sequentially hold the distortion correction range calculated in the distortion correction range calculation unit, wherein the control unit uses, as the present distortion correction range, the distortion correction range held in the register.

10. The imaging apparatus according to claim 8, further comprising a register configured to sequentially hold the distortion correction range calculated in the distortion correction range calculation unit, wherein the control unit uses, as the present distortion correction range, the distortion correction range held in the register.

11. The imaging apparatus according to claim 9, wherein the distortion correction range calculation unit calculates the present distortion correction range and the next distortion correction range only if the present block line is the uppermost part of the image data, and calculates only the next distortion correction range if the present block line is other than the uppermost part of the image data.

12. The imaging apparatus according to claim 10, wherein the distortion correction range calculation unit calculates the present distortion correction range and the next distortion correction range only if the present block line is the uppermost part of the image data, and calculates only the next distortion correction range if the present block line is other than the uppermost part of the image data.

* * * * *